(12) United States Patent
LaFreniere et al.

(10) Patent No.: US 9,479,636 B2
(45) Date of Patent: Oct. 25, 2016

(54) SYSTEM AND METHOD FOR MANAGING MOBILE TELEPHONES

(75) Inventors: Gary W. LaFreniere, Olathe, KS (US); Kelsyn D. S. Rooks, Overland Park, KS (US); David E. Emerson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 312 days.

(21) Appl. No.: 12/625,964

(22) Filed: Nov. 25, 2009

(65) Prior Publication Data

US 2011/0124314 A1 May 26, 2011

(51) Int. Cl.
*H04M 1/66* (2006.01)
*H04M 1/725* (2006.01)
*H04M 3/42* (2006.01)

(52) U.S. Cl.
CPC ..... *H04M 1/72577* (2013.01); *H04M 3/42272* (2013.01); *H04M 1/72525* (2013.01); *H04M 1/72572* (2013.01); *H04M 2207/18* (2013.01); *H04M 2250/10* (2013.01)

(58) Field of Classification Search
CPC ...... H04W 12/08; H04W 48/02; H04W 4/24
USPC ........................................................ 455/410
See application file for complete search history.

(56) References Cited

U.S. PATENT DOCUMENTS

| | | | |
|---|---|---|---|
| 5,950,138 A | 9/1999 | Norimatsu | |
| 8,644,795 B2 | 2/2014 | LaFreniere et al. | |
| 9,154,956 B2 | 10/2015 | LaFreniere et al. | |
| 2004/0162876 A1* | 8/2004 | Kohavi | 709/203 |
| 2004/0267971 A1* | 12/2004 | Seshadri | 710/8 |
| 2008/0070609 A1 | 3/2008 | Ackley | |
| 2008/0114862 A1* | 5/2008 | Moghaddam et al. | 709/220 |
| 2009/0099919 A1* | 4/2009 | Schultheiss et al. | 705/14 |
| 2010/0268589 A1 | 10/2010 | Wesby | |
| 2011/0124315 A1 | 5/2011 | LaFreniere et al. | |
| 2014/0106716 A1 | 4/2014 | LaFreniere et al. | |

OTHER PUBLICATIONS

U.S. Appl. No. 12/625,990; Non Final Office Action dated Dec. 6, 2011; 7 pages.
U.S. Appl. No. 12/625,990; Final Rejection dated May 18, 2012; 13 pages.
U.S. Appl. No. 12/625,990; Non Final Office Action dated Feb. 28, 2013; 20 pages.
U.S. Appl. No. 12/625,990; Final Rejection dated Jun. 18, 2013; 18 pages.
U.S. Appl. No. 12/625,990; Notice of Allowance dated Sep. 30, 2013; 19 pages.
U.S. Appl. No. 12/625,964; Issue Notification dated Jan. 15, 2014; 1 page.
U.S. Appl. No. 14/140,877; Non-Final Rejection dated Apr. 10, 2014; 22 pages.

(Continued)

*Primary Examiner* — Omoniyi Obayanju
(74) *Attorney, Agent, or Firm* — Swanson & Bratschun, L.L.C.

(57) ABSTRACT

Disclosed are a system and method for associating a plurality of telephone numbers with a mobile telephone that includes a database of a plurality of telephone numbers linked to a plurality of codes and a mobile telephone network configured and arranged to associate the mobile telephone with a particular telephone number when the network receives the code linked to the particular telephone number.

14 Claims, 5 Drawing Sheets

(56) References Cited

OTHER PUBLICATIONS

U.S. Appl. No. 14/140,877; Final Rejection dated Jul. 15, 2014; 13 pages.
U.S. Appl. No. 14/140,877; Non-Final Rejection dated Nov. 7, 2014; 13 pages.
U.S. Appl. No. 14/140,877; Final Rejection dated Feb. 20, 2015; 15 pages.
U.S. Appl. No. 14/140,877; Notice of Allowance dated Jun. 6, 2015; 20 pages.
U.S. Appl. No. 14/140,877; Issue Notification dated Sep. 16, 2015; 1 page.

* cited by examiner

SYSTEM AND METHOD FOR MANAGING MOBILE TELEPHONES

TECHNICAL FIELD

The claims and disclosure relate to the technical field of managing mobile telephones.

BACKGROUND

In some situations, it is beneficial for a mobile telephone to have the capacity to be shared between multiple users, for example, with community telephones for a business or organization. Currently, some mobile telephones use Subscriber Identity Module (SIM) cards which can be physically moved between mobile telephones to configure a particular mobile telephone to a particular user.

SUMMARY

Disclosed herein is a system and method that enables a mobile telephone to be configured with a particular telephone number upon entry of a code into the telephone. In one embodiment, the disclosed system and method permits the sharing of a single physical telephone with multiple individuals who each receive and send telephone calls to and from their individual telephone numbers. In another embodiment, the disclosed system and method permits the use of a fleet of telephones configurable to specific telephone numbers as needed. For example, a business could share a number of telephones among multiple employees based on particular needs or circumstances, wherein the telephones are configured and reconfigurable to a particular telephone number and/or user as desired. In another embodiment, this system and method enables multiple individuals to use a single mobile telephone while each keeping personalized telephone settings. In yet another embodiment, this system and method permits use of a single plan or shared plan to manage the call time, data usage or text usage allocated to subaccounts and disable particular telephones from additional usage, for example, to ensure that the shared plan does not go over plan limits.

DETAILED DESCRIPTION OF THE DRAWINGS

Reference is now made to certain embodiments thereof and specific language used to describe the same. It should nevertheless be understood that no limitation of the scope of this disclosure and the claims are thereby intended, such alterations, further modifications and further applications of the principles described herein being contemplated as would normally occur to one skilled in the art to which the disclosure relates. In several figures, where there are the same or similar elements, those elements are designated with the same or similar reference numerals.

Figure 1:
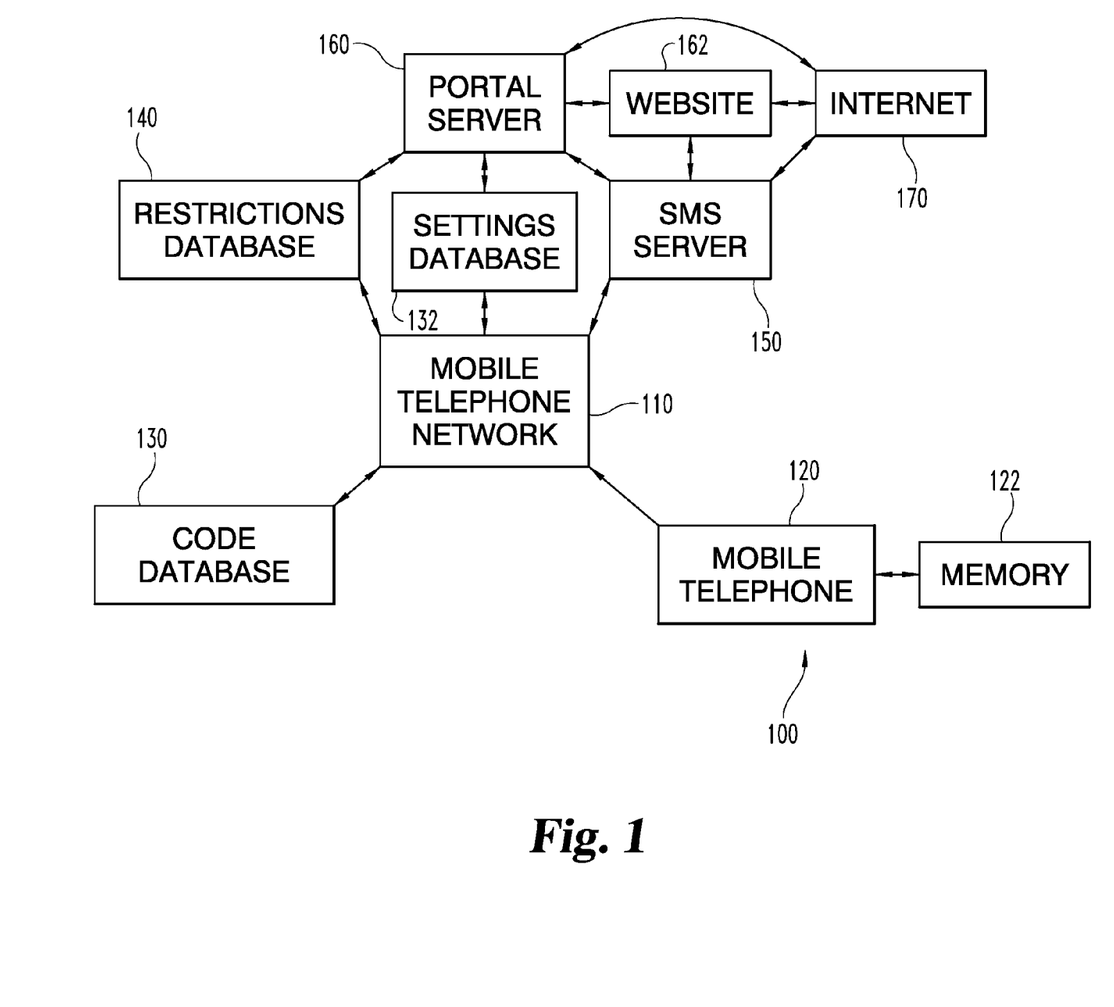
FIG. 1 illustrates a system diagram of a mobile telephone network.

Referring now to FIG. 1, communication system 100 is illustrated. Communication system 100 includes mobile telephone network 110, mobile telephone 120, code database 130, settings database 132, restrictions database 140, SMS server 150, portal server 160, website 162 and internet 170. Mobile telephone 120 may optionally include memory 122. In one embodiment, memory 122 can be wholly or partly in the form of a removable Subscriber Identity Module (SIM) card. In another embodiment, memory 122 can be in the form of a micro-SD (Secure Digital) slot and a removable micro-SD memory card. For example, in one embodiment an individual could use a SIM card, micro-SD memory card or other form of removable memory to transfer photographs 408 or any other customized setting 400 (see FIG. 4) between various local telephones.

Mobile telephone network 110 communicates with mobile telephone 120 via any desired communication protocol. The particular configuration of mobile telephone network 110 may vary between carriers and by the technology used to communicate with mobile telephone 120. The communication link between mobile telephone network 110 and mobile telephone 120 may include voice communications, data communications, text message, short message service (SMS), data transfer, settings information and restrictions information.

Mobile telephone network 110 is operably connected to code database 130, settings database 132, restrictions database 140, SMS server 150 and portal server 160. Code database 130 includes a plurality of telephone numbers individually associated with a plurality of codes. Settings database 132 includes mobile telephone settings linked to the list of telephone numbers that may be the same list of telephone numbers in code database 130. Restrictions database 140 may include instructions for the operation of mobile telephone network 110 (restrictions) associated with a list of telephone numbers that may be the list of telephone numbers in code database 130. Portal server 160 may be operable to permit a user to access SMS server 150 and settings database 132 via internet 170 to permit the user to manage any missed text messages, voice mails, their contacts list, call history, etc., when they are not provisioned on mobile telephone 120.

Portal server 160 may be operable to provide on-line access via internet 170 to permit users to check minutes-of-usage remaining for a particular period. Portal server 160 can also provide information as to users currently provisioned on a mobile telephone and those users and/or telephone numbers that are not currently available for telephonic communications. In one embodiment, portal server 160 can also have the alternative landline number associated with users. In yet another embodiment, portal server 160 can report a user's current telephone number including mobile telephone 120 if currently provisioned to that user's personal mobile telephone, or landline telephone number if the user is not currently provisioned on a mobile telephone.

Settings database 132, restrictions database 140 and SMS server 150 are operatively connected to portal server 160. Portal server 160 is operably connected to internet 170 and website 162. These operative connections through portal server 160 to internet 170 permit authorized users to access and/or modify the contents of settings database 132, restrictions database 140 and SMS server 150 via an internet connection (including via mobile telephone 120).

Figure 2:
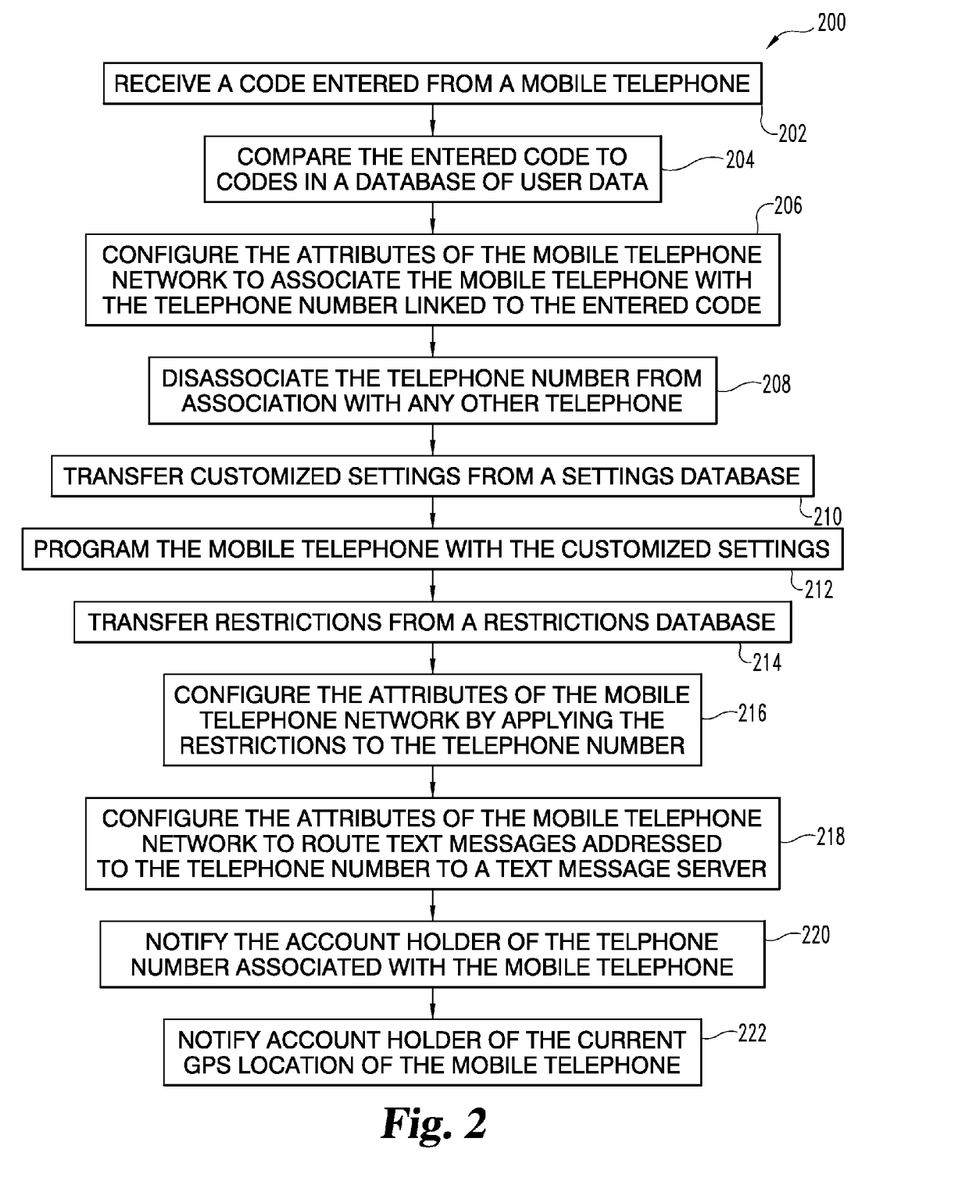
FIG. 2 illustrates a procedure for configuring a mobile telephone network to associate a mobile telephone with one of the plurality of telephone numbers.

Referring now to FIG. 2, procedure 200 is illustrated. Procedure 200 includes acts for configuring a mobile telephone network to associate a mobile telephone with one of a plurality of telephone numbers. Procedure 200 begins with act 202 where mobile telephone network 110 receives a code inputted into mobile telephone 120 and transferred to mobile telephone network 110. As described above, this data transfer utilizes any appropriate data transfer technique or method for mobile telephone 120 to communicate with mobile telephone network 110. Procedure 200 continues with act 204 where mobile telephone network 110 accesses code database 130 and compares the entered code to the codes in the code database 130 to validate the entered code. In act 206, mobile telephone network 110 configures the attributes of mobile telephone 120 to associate mobile telephone 120 with the telephone number in code database 130 linked to the entered code. In one embodiment, act 206 may include associating the mobile station I.D. (MSID) with the serial number for the mobile telephone.

The MSID is a number that is associated with the home service provider and the telephone number. The end user MSID, model of mobile telephone 120 and other key attributes for provisioning mobile telephone 120 are stored in mobile telephone 120 and/or memory 122 and/or mobile telephone network 110 and are associated to a master MSID.

In one embodiment, when a user turns on mobile telephone 120, software on mobile telephone 120 requests entry of the code for use. The client would then input the code and mobile telephone 120 would then access mobile telephone network 110 to complete acts 204 and 206.

Procedure 200 continues with act 208 where mobile telephone network 110 disassociates the telephone number associated with mobile telephone 120 in act 206 from association with any other telephone. Procedure 200 continues with act 210 where customized settings are transferred from settings database 132 and/or from memory 122 to mobile telephone 120. As detailed below with regard to FIG. 4, the custom settings transferred can include, but are not limited to, contacts, call history, downloads, photographs, internet favorites, sound settings, display settings, call settings, calendar, blue tooth settings, minutes of use, text usage and data usage. In act 212, mobile telephone 120 is programmed with the customized settings transferred to mobile telephone 120 in act 210. Act 212 results in either the creation of new settings in mobile telephone 120 or in overriding or reprogramming comparable customized settings from a previous association in mobile telephone 120.

Procedure 200 continues with act 214, where restrictions from restrictions database 140 are transferred to mobile telephone 120 via mobile telephone network 110. As described below with regard to FIG. 5, restrictions can include but are not limited to minutes-of-use, GPS location, number of text messages, data use, time of day, restrictions and/or day-of-week restrictions. In act 214, the attributes of mobile telephone network 110 are configured by applying the transferred restrictions to mobile telephone 120. For example, in the case of minutes-of-use restriction, in the event mobile telephone network 110 detects that the telephone number associated with mobile telephone 120 has exceeded its minutes-of-use for a given time period then mobile telephone 120 (and the telephone number associated with it) can be blocked from sending or receiving additional calls during the given time period.

Procedure 200 continues with act 218 where mobile telephone network 110 is configured to route text messages (SMS messages) addressed to the telephone number associated with mobile telephone 120 to SMS server 150. This routing can be in lieu of or in addition to any routing elsewhere, including routing directly to mobile telephone 120. In one embodiment, all text messages routed to any telephone number in code database 130 are routed to SMS server 150 regardless of the association of any particular number with a particular telephone. In one embodiment, SMS server 150 may forward text messages of particular users to an e-mail address. Such forwarding can be in lieu or in addition to storing the text message on SMS server 150.

Procedure 200 continues with act 220 where notification of the status of mobile telephone 120 and the telephone number currently associated with mobile telephone 120 is sent to an account holder. Notification may optionally include GPS information reflecting the current approximate GPS location of mobile telephone 120. Procedure 200 concludes with act 222 where the account holder is notified of the current GPS location of mobile telephone 120. Act 222 can be repeated as often as desired to permit the location of the mobile telephone to be tracked by the account holder.

Figure 3:
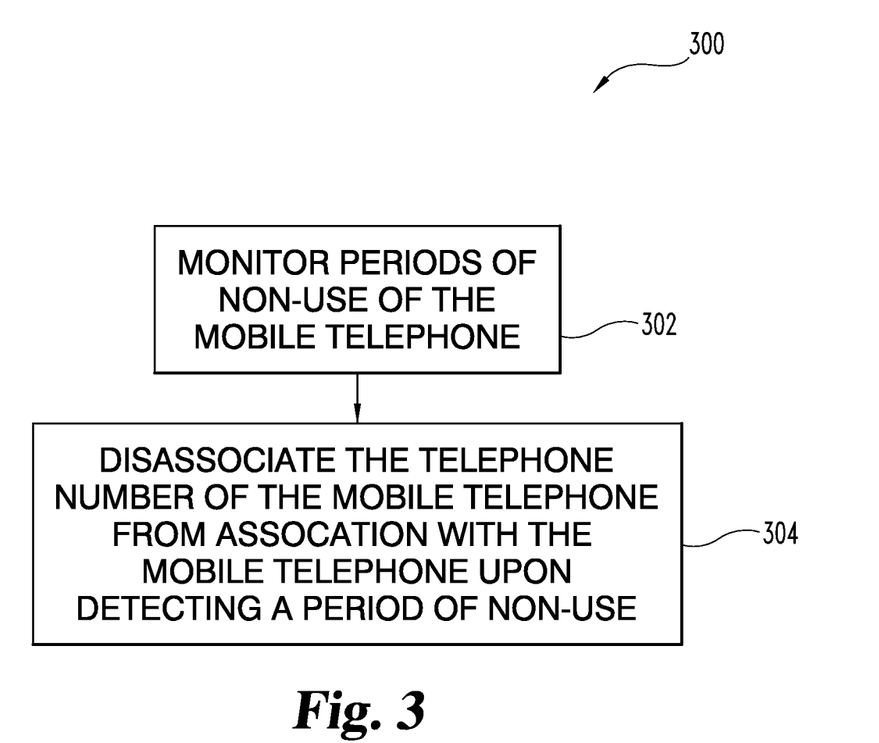
FIG. 3 illustrates a procedure for disassociating a telephone number from association with a mobile telephone due to a period of nonuse.

Referring now to FIG. 3, procedure 300 is illustrated. Procedure 300 monitors nonuse of mobile telephone 120 and disassociates mobile telephone 120 from association with the telephone number upon detecting a period of nonuse. Procedure 300 includes act 302 where mobile telephone network 110 monitors the use and keeps track of periods of nonuse of mobile telephone 120. Procedure 300 concludes with act 304 where mobile telephone network 110 disassociates mobile telephone 120 from association with the current telephone number when mobile telephone network 110 detects sufficient period of nonuse. The actual period of nonuse required can be varied and customized as needed. For example, the period of nonuse required for disassociation could be eight hours.

Figure 4:
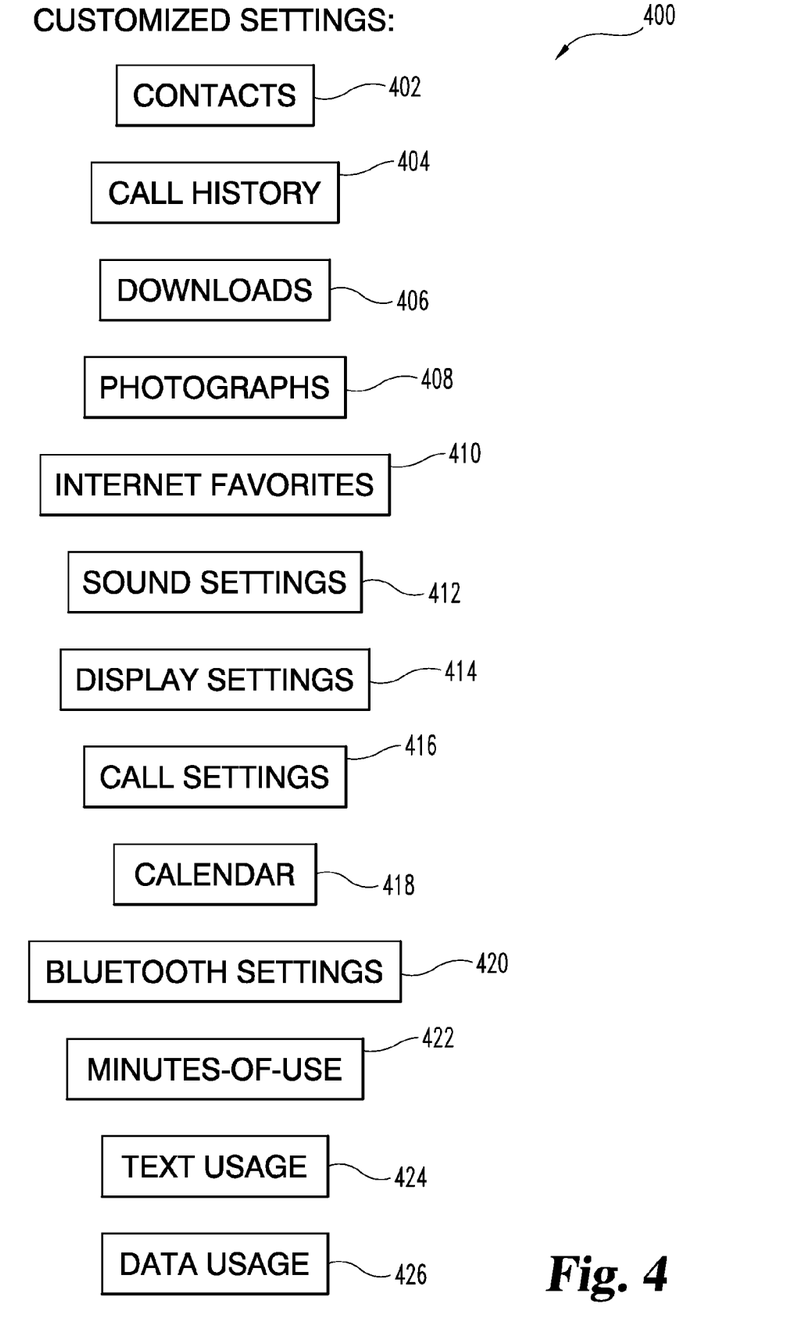
FIG. 4 illustrates a list of optional customized settings that can be downloaded from a settings database.

Referring now to FIG. 4, customized settings 400 are illustrated. Customized settings 400 include some of the customized settings that can be programmed into mobile telephone 120 after validation of an entered code. As described above, customized settings 400 can be stored in memory 122 or in settings database 132 and transferred and programmed into mobile telephone 120. In some embodiments, the association between customized settings 400 and a particular phone number in settings database 132 may permit users to load customized settings 400 onto new devices as old devices are upgraded (or replaced if lost). Similarly, settings database 132 may permit a recovery of customized settings 400 in the event a device is reset to factory default settings.

Customized settings 400 may include contacts 402, call history 404, downloads 406, photographs 408, internet favorites 410, sound settings 412, display settings 414, call settings 416, calendar 418, Bluetooth settings 420, minutes-of-use 422, text usage 424 and data usage 426. Contacts 402 can include lists of names and telephone numbers and possibly e-mail and instant message addresses. Call history 404 can include a history of sent and received calls. Downloads 406 can include custom applications for mobile telephone 120. Photographs 408 can include personal photographs stored in mobile telephone 120 or memory 122 and background screen displays. Internet favorites 410 may include bookmarked internet sites. Sound settings 412 can include ring tones and ring tone associations with contacts 402. Display settings 414 may include a background image brightness contrast settings. Call settings 416 can include answer options and automatic retry options. Display settings 414 may include banner, backlight, wallpaper, display themes, fonts and clock format. Sound settings 412 can include volume, call sounds in association with various contacts 402, alert sounds, key pad volume, ear piece volume and alarm sounds. Call settings 416 may include TTY mode, one-touch speed dial settings, voice privacy and ringer settings. Calendar 418 may include appointments and reminders. Bluetooth settings 420 can include Bluetooth device associations. Minutes-of-use 422 may include the number of remaining minutes-of-use for a given period. Text usage 424 can include a number of text messages remaining for a given period for either sent and/or received text messages. Data usage 426 may include internet connection time limits and/or limitations on the amount of data transfer permitted.

Figure 5:
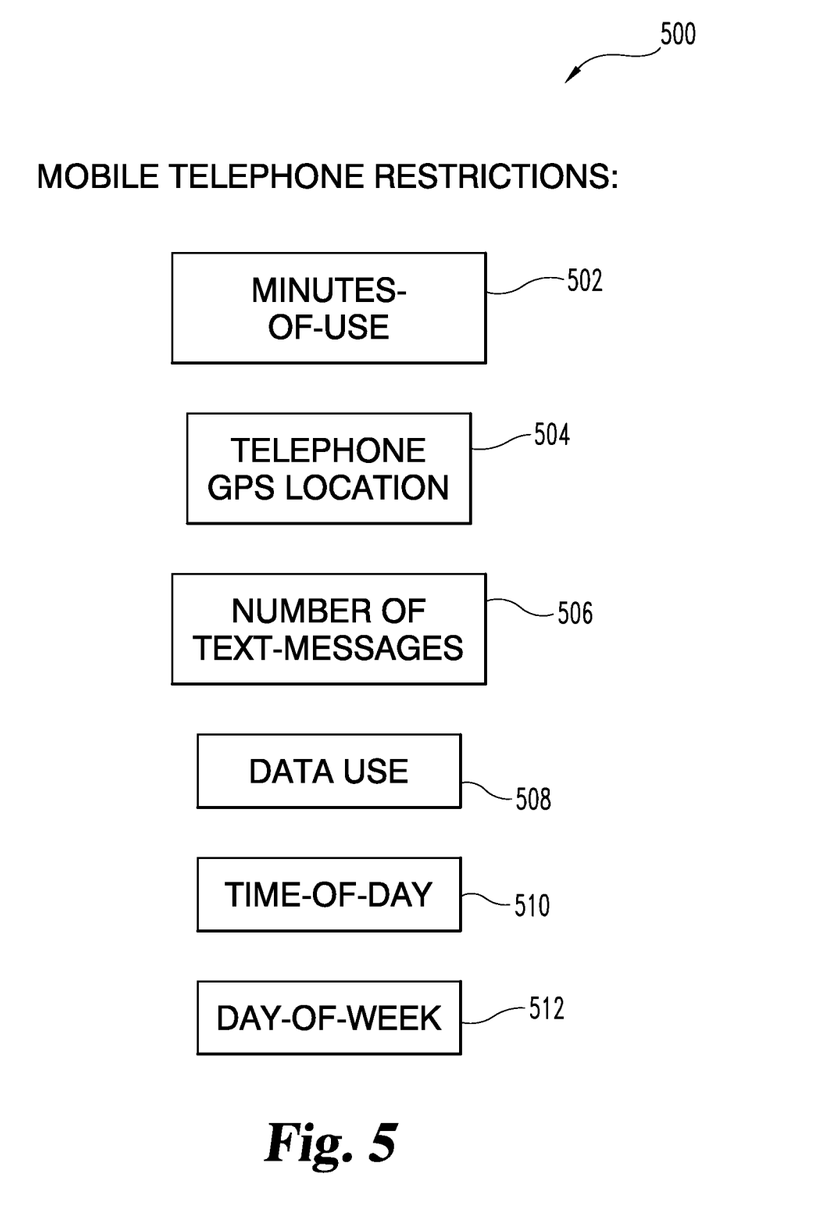
FIG. 5 illustrates a list of optional restrictions that can be downloaded from a restrictions database.

Referring to FIG. 5, mobile telephone restrictions 500 are illustrated. Mobile telephone restrictions 500 are stored in restrictions database 140 and are applied to the use of mobile telephone 120 and/or the associated telephone number on mobile telephone network 110. Mobile telephone restrictions 500 includes minutes-of-use 502, telephone GPS location 504, number of text-messages 506, data use 508, time-of-day 510 and day-of-week 512. Minutes-of-use 502 may include the number of minutes of telephone usage remaining for a given period. For example, minutes-of-use remaining during a month billing cycle. Telephone GPS location 504 can include either GPS locations of permitted use or GPS locations of excluded use. The number of text-messages 506 is the number of text messages allowed for a particular billing cycle. Data use 508 is the number of minutes of internet access and/or download data transfer limitations for a particular billing cycle. Time-of-day 510 may include a list of times in which access to mobile telephone network 110 by mobile telephone 120 is permitted or a list of times in which access is prohibited. Day-of-week 512 is a listing of days of allowed access or days of prohibited access to mobile telephone network 110 by mobile telephone 120 (or the associated telephone number).

Authorized users can access restrictions database 140 via portal server 160 and/or internet 170 to manage individual mobile telephone usage and calling restrictions for community mobile telephone users. Restrictions database 140 and mobile telephone restrictions 500 can be enforced and modified in a near real time manner by the account holder accessing restrictions database 140 in a real time manner on-line. When changes to restrictions database 140 are made by an authorized user, mobile telephone network 110 is operable to update restrictions applied to mobile telephone 120 with the changes made to restrictions database 140.

Mobile telephone restrictions 500 can be applied to mobile telephone 120 (or the associated telephone number) and mobile telephone network 110 in a variety of ways. In one embodiment, mobile telephone restrictions 500 may be absolute wherein access by mobile telephone 120 via mobile telephone network 110 is prohibited if any mobile telephone restriction 500 is violated. For example, if mobile telephone 120 exceeds its minutes-of-use 502 limitation for a particular period, mobile telephone 120 may be prohibited from sending and/or receiving any further calls during the particular period. In another embodiment, mobile telephone restrictions 500 can be applied to provide a warning, for example, an SMS message sent by mobile telephone network 110 to mobile telephone 120 indicating a restriction has been exceeded. In yet another embodiment, restrictions 500 can include exceptions to general restrictions. For example, in the event minutes-of-use restriction 502 is exceeded calls are prohibited except for calls received from or sent to a particular telephone number. Restrictions 500 can be enforced either at mobile telephone network 110 and/or at mobile telephone 120.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A system for associating a plurality of telephone numbers with a mobile telephone, the system comprising:
    a code database comprising the plurality of telephone numbers linked to a plurality of codes;
    a mobile telephone network configured and arranged to:
        upon validation of a particular code entered into the mobile telephone, associate the mobile telephone with a particular telephone number and program the mobile phone with customized settings downloaded from memory on the mobile phone, wherein the particular telephone number is determined by accessing the code database to determine the particular telephone number linked to the particular code; and
        automatically disassociate the particular telephone number from association with any other telephone upon associating the mobile telephone with the particular telephone number;
    a text message server associated with the plurality of telephone numbers, wherein text messages addressed to any of the plurality of telephone numbers are routed to the text message server where they are stored in a text message database; and
    a computer server in communication with the world-wide-web via a website, wherein the computer server is constructed and arranged to permit a mobile telephone account user to access and manage missed text messages stored on the text message server when the mobile telephone account user is not provisioned on the mobile telephone.

2. The system of claim 1, wherein the customized settings are selected from the group consisting of: contacts, call history, downloads, photographs, internet favorites, sound settings, display settings, call settings, calendar, Bluetooth settings, current minutes-of-use, and text usage.

3. The system of claim 1, further comprising a restrictions database comprising a plurality of mobile telephone restrictions linked to the plurality of telephone numbers, wherein the mobile telephone network is operable to disable the mobile telephone from further use when certain conditions are detected by the mobile telephone network based on the mobile telephone restrictions linked to the particular telephone number.

4. The system of claim 3, wherein the mobile telephone restrictions are selected from the group consisting of: minutes-of-use, telephone GPS location, number of text-messages, data use, time-of-day and day-of-week.

5. The system of claim 3, further comprising the computer server in communication with the world-wide-web via the website, wherein the computer server is constructed and arranged for an authorized user to access and manage mobile telephone restrictions.

6. The system of claim 1, further comprising:
    a settings database comprising a plurality of mobile telephone settings linked to the plurality of telephone numbers, wherein, upon validation of the code, the mobile telephone network is configured and arranged to program the mobile telephone with customized settings downloaded from the settings database.

7. The system of claim 6, further comprising:
the computer server in communication with the world-wide-web via the website, wherein the computer server is constructed and arranged for a mobile telephone account user to access and manage customized settings linked to the user's particular telephone number.

8. A method for configuring a mobile telephone network to associate a mobile telephone with one of a plurality of telephone numbers, the method comprising the acts of:
at the mobile telephone network, receiving a code entered from the mobile telephone;
accessing a code database user data that includes a plurality of codes linked to the plurality of telephone numbers;
validating the code by comparing the entered code to the plurality of codes in the code database;
configuring the attributes of the mobile telephone network to associate the mobile telephone with a particular telephone number of the plurality of telephone numbers linked to the entered code;
programming the mobile telephone with customized settings downloaded from memory on the mobile phone;
automatically disassociating the particular telephone number from association with any other telephone upon associating the mobile telephone with the particular telephone number;
configuring the attributes of a mobile telephone network to route text messages addressed to any of the plurality of telephone numbers to a text message server associated with the plurality of telephone numbers; and
accessing the text message server via a world-wide-web website in communication with the text message server, wherein the text message server is constructed and arranged to permit a mobile telephone account user to access and manage missed text messages stored on the text message server when the mobile telephone account user is not provisioned on the mobile telephone.

9. The method of claim 8, wherein the customized settings are selected from the group consisting of: contacts, call history, downloads, photographs, internet favorites, sound settings, display settings, call settings, calendar, Bluetooth settings, current minutes-of-use, and text usage.

10. The method of claim 8, further comprising the act of:
upon detecting a period of non-use of the mobile telephone, disassociating the telephone number from association with the mobile telephone.

11. The method of claim 8, further comprising the acts of:
accessing a restrictions database comprising a plurality of mobile telephone restrictions linked to the particular telephone number to determine a particular mobile telephone restriction; and
disabling the mobile telephone from further use upon the network detecting a certain condition defined by the particular mobile telephone restriction.

12. The method of claim 11, wherein the mobile telephone restrictions are selected from the group consisting of: minutes-of-use, telephone GPS location, number of text-messages, data use, time-of-day and day-of-week.

13. The method of claim 11, further comprising the act of:
programming the restrictions database by an authorized user accessing and managing the restrictions database via the world-wide-web web site in communication with the restrictions database.

14. The method of claim 8, further comprising the act of:
programming the mobile telephone with customized settings downloaded from a settings database including a plurality of mobile telephone settings linked to the plurality of telephone numbers.

\* \* \* \* \*